Figure 2:
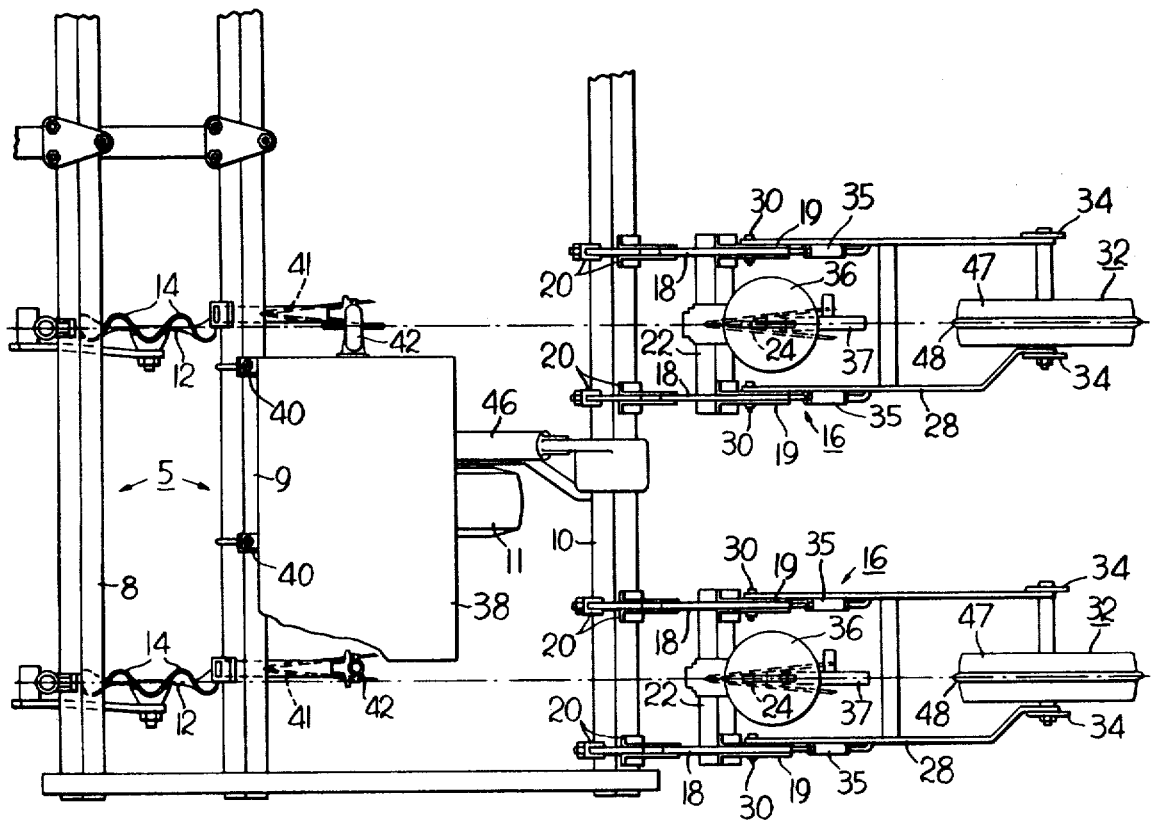

United States Patent

Krumholz

[15] 3,701,327
[45] Oct. 31, 1972

[54] PLANTER AND METHOD OF PREPARING SOIL

[72] Inventor: Frank C. Krumholz, Hales Corners, Wis.

[73] Assignee: Allis-Chalmers Manufacturing Company, Milwaukee, Wis.

[22] Filed: June 1, 1970

[21] Appl. No.: 41,736

Related U.S. Application Data

[63] Continuation of Ser. No. 662,393, Aug. 22, 1967, abandoned.

[52] U.S. Cl. .......................... 111/81, 111/85, 111/87
[51] Int. Cl. .................................................. A01c 5/00
[58] Field of Search .......... 111/85, 88, 80, 73, 14, 87, 111/81; 172/144, 604, 555

[56] References Cited

UNITED STATES PATENTS

| | | |
|---|---|---|
| 809,888 | 1/1906 | Avery .................... 172/604 X |
| 3,237,577 | 3/1966 | Wilkens .................. 172/555 X |
| 3,362,361 | 1/1968 | Morrison, Jr. ............ 111/85 X |
| 3,122,111 | 2/1964 | Taylor ........................ 111/80 |
| 395,638 | 1/1889 | Stuart .................... 172/604 X |
| 3,331,341 | 7/1967 | Hartwig ..................... 111/73 |
| 2,738,969 | 3/1956 | Morris et al. ............ 111/85 X |
| 1,204,239 | 11/1916 | Bozard ....................... 111/88 |
| 2,691,353 | 10/1954 | Secondo .................. 111/87 X |

*Primary Examiner*—Robert E. Pulfrey
*Assistant Examiner*—Stephen C. Pellegrino
*Attorney*—Kenneth C. McKivett, Robert B. Benson and Charles L. Schwab

[57] ABSTRACT

A combination of rolling ground contacting tools for preparing a seed bed, fertilizing, dropping seed and covering and forming the soil about the seed under existing conditions without previous soil preparation.

2 Claims, 2 Drawing Figures

PATENTED OCT 31 1972 3,701,327

Inventor
Frank C. Krumholz
By Kenneth Huebner
Attorney

PLANTER AND METHOD OF PREPARING SOIL

This is a continuation of application Ser. No. 662,393, filed 8/22/67, now abandoned.

The present invention relates generally to an improved method and apparatus for preparing soil and planting seed which is characterized by the planting of seed and, if desired, the placement of fertilizer under existing ground conditions without previous soil preparation.

The present embodiment of the invention is designed to operate in any row crop, pasture or meadow aftermath. It will cut through sod or surface trash and loosen a cross section of soil to the desired width and seed zone depth. It will place the seed at the proper depth in the loosened zone of soil. It will deposit the desired quantity of fertilizer any place desired, either below, above, or to the side of the seed zone. Finally, this planter will firm sufficient soil around the deposited seed for immediate movement of moisture to the seed resulting in quick germination and uniform emergence of the young seedlings.

An object of this invention is to place seed into the soil for proper germination and emergence and this through any field surface trash condition without any prior or past planting field tillage required.

Prior to the present invention the following operations were performed prior to planting: plowing, disk harrowing (up to two times) spike tooth harrowing (up to two times), planting, cultivating (up to four times) or in other words, approximately ten field operations were required when the present invention calls for but one pass across the field. This old conventional method resulted in increased soil compaction, tillage costs, soil erosion, manpower requirement and equipment investment. In addition, such conventional practice made less moisture available during the growing season.

Accordingly, it is an object of this invention to provide an improved planter mechanism which greatly improves the efficiency of growing crops.

It is a further object of this invention to provide a combination of rolling ground contacting tools for preparing a seed bed, fertilizing, dropping seed and covering and firming the soil about the seed in one trip across the field regardless of the type of field.

Figure 1:
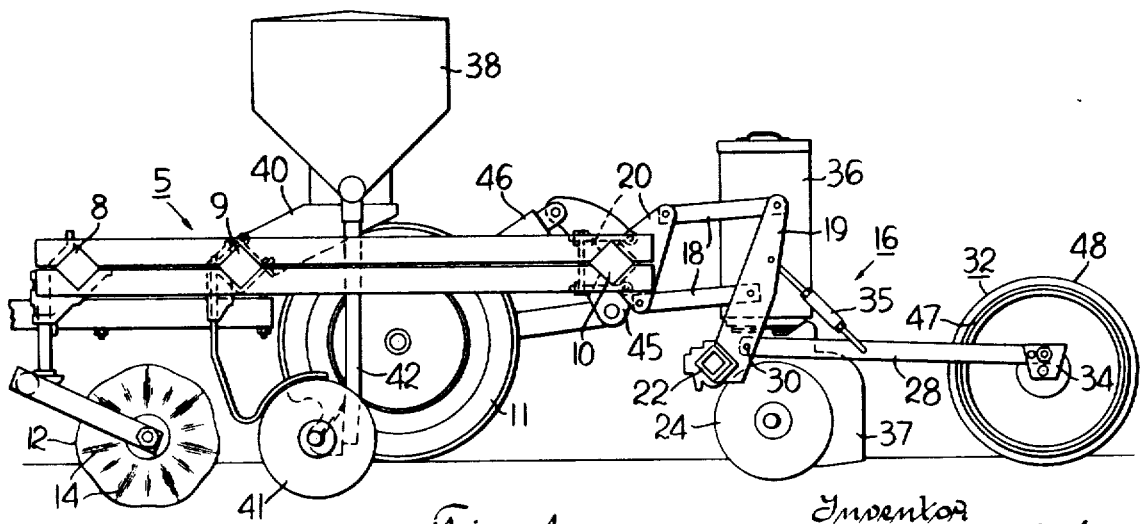

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevation of a combination of planting mechanisms embodying the invention; and FIG. 2 is a plan view of the combination shown in FIG. 1.

Referring now to the drawing, the planter frame 5 includes transverse tool bars 8, 9 and 10 which can be supported on a tractor as a fully mounted implement or the frame 5 can be equipped with its own carrying or transport wheels as a trail or pull behind type planter, as shown in the drawings. In either case, the front tool bar 8 mounts fixed or spring loaded coulters 12 having flutes 14 and which coulters are spring biased downwardly into the ground. It should be understood that penetration of the coulters 12 into the ground is accomplished by the static weight of the implement assembly and the depth of penetration is gauged from either the tractor rear wheels in the case of a fully mounted implement or from separate gauge wheels adjustably fixed to the planter frame in the case of the trail behind planter shown.

The planter units, generally indicated at 16, consist of parallel link frames 18 which are laterally spaced and rigidly secured to tool bar 10 by means of clamps 20. A cross tube 22 unites the rear portions of the two frames 18 through the medium of standard 19 to which frames 18 are pivotally attached and tube 22 also rigidly mounts the double disk seed opener 24. A vertically adjustable press wheel frame 28 is pivotally mounted on standards 19 at their forward ends 30 and has a press wheel 32 journaled between their rearward ends 34. Turnbuckles 35 are provided to adjust arms 28 and thereby wheel 32 relative to standards 19. A seed hopper 36 is mounted on the double disk seed opener boot casting 37. A fertilizer hopper 38 is rigidly mounted on the cross bar 9 by means of bracket 40. A fertilizer disk opener 41 is mounted on frame member 9. Fertilizer is conveyed to the opener 41 by means of a flexible tube 42.

It is to be noted that a series of rotating elements in combination have been provided. This series being at least three rotating elements and four if a fertilizer distributor is used. These rotating elements positioned in general longitudinal alignment prepare a relatively narrow strip of soil (approximately 2 ½ inches wide) through the sod or surface trash, deposit seed and fertilizer in the prepared strip of soil and close or compress the soil around the seed leaving a depression in the soil above the seed. The working of the soil, depositing of seed and fertilizer, and closing of the seed furrow by means of rotating members keeps the lateral movement of soil to a minimum so that the planter can be operated through heavy trash or sod. It is also an advantage to keep from forcing or troweling a groove in the soil as with a nonrotating opener which would result in air pockets and difficulty in firming the soil around the seed.

The aforementioned combination of elements operates efficiently to cut through the sod or surface trash and prepare a loosened seed zone in the soil. This combination uses a fluted rotating disk coulter 12 to cut through the trash and penetrate the soil, the action of the flutes 14 has a loosening effect on the soil to prepare a seed zone approximately 2 ½ inches wide for the seed. A plain coulter blade or a runner opener would not cut the sod or trash as efficiently and would tend to compact the soil, forming a trench with a well defined wall which trench would make it difficult to close and firm the soil around the seed. This combination also uses a conventional double disk seed opener 24 to operate in the loosened zone formed by the fluted coulter 12, thereby efficiently cutting through any remaining trash or sod to obtain a narrow profile trench or furrow in which the soil isn't compacted so that some soil falls back over the seed. If desired, springs (not shown) may be provided to get even penetration of the seed opener 24 to its gauged depth.

In the combination if fertilizer is desired to be deposited, a rotating disk opener 41 is used where desired either ahead or behind the double disk seed opener 24. When located ahead of the seed opener, as shown, the slightly laterally offset fertilizer opener 41 tends to further loosen the soil worked up by the leading fluted coulter 12. By locating the fertilizer opener 41 behind the seed opener 24, the lateral movement of soil by the fertilizer opener tends to close the seed furrow thereby assuring the soil is available to cover the seed.

With the combination, the soil is firmed around the seed to eliminate air pockets and facilitate movement of moisture to the seed. In the combination shown, the wheel 11 drives the fertilizer dispensing mechanisms in a conventional manner and gauges the depth of operation of the fertilizer's dispensing mechanism. Gauge wheel 11 is pivotally attached to bracket 45 carried by frame 10. Hydraulic cylinder 46 is connected between wheel 11 and frame 10 for adjusting the height of frame 5. The press wheel 32 is also a gauge wheel for the seed dispensing mechanism. Press wheel 32 also drives the seed dispensing mechanism by means (not shown) and also performs a final firming of the soil around the seed. The press wheel tire 47 is the conventional semipneumatic type having an integral centrally located circumferentially extending rib 48 which exerts a compressive action on the soil immediately above the deposited seed to eliminate air pockets and obtain capillary attraction of moisture to the soil around the seed for improved germination and uniform emergence of the seedlings. This type of press wheel controls the firming of the soil over the seed and provides adequate ground contact area for both flotation and traction. This method of firming the soil keeps the seed zone area clear of trash and the like which might act as an impediment to seed emergence. In addition, this press wheel peripheral rib 48 leaves a depression in the soil directly over the seed which tends to catch and hold any available moisture for beneficial use before and after emergence.

Referring to FIG. 2, it should be noted that fluted coulter 12, disk opener 24 and press wheel 47 are located in longitudinal alignment so that each one of these rotating members is working on the narrow seed bed prepared by the fluted coulter. And if a fertilizer distributor is used, the rotating disk openers 41 thereof also work on this same narrow seed bed. From the foregoing, it is readily apparent as to the savings produced by the subject manner of planting. In other words, the ground between the narrow seed beds of the adjacent units 16 is not worked and accordingly this represents labor saving, ground moisture saving and implement capital investment saving.

Although the invention has been described and illustrated with respect to a preferred embodiment thereof, it is to be understood that it is not to be so limited since changes and modifications may be made therein which are within the full intended scope of this invention.

The embodiments of the invention in which an exclusive property or privilege is claimed are defined as follows:

1. A minimum tiltage planter comprising a supporting frame
    a. a disk coulter rotatably supported from said planter frame and being provided with a fluted peripheral cutting edge with said flutes extending from said periphery radially approximately to the center of said disk, said coulter being rotatably mounted at the forward end of said frame and being spring biased downwardly into the ground for forming a narrow band of the order of 1 ¼ inches of worked soil on each side of a longitudinal axis,
    b. a furrow closing and soil compacting member carried by said frame and positioned rearwardly of said coulter with the transverse midportion of said compacting member lying on said longitudinal axis for compacting said narrow bands of worked soil,
    c. a furrow opener comprising a pair of coacting soil contacting disks positioned on said frame between said fluted disk coulter and said soil compacting member for opening a furrow along said longitudinal axis in the soil worked by said coulter,
    d. a seed dispensing device positioned on said frame between said furrow opener and said soil compacting member and communicating with said furrow opener for depositing seeds in said opened furrow along said longitudinal axis, and
    e. a fertilizer distributor positioned on said frame between said disk coulter and said said seed dispensing device for depositing fertilizer in one of said bands of worked soil adjacent the outer edge thereof.

2. The combination recited in claim 1 and wherein said fertilizer distributor includes a pair of coacting rotary soil contacting members positioned to contact one of said narrow bands of soil worked by said fluted disk coulter in transversely spaced relation to said longitudinal axis.

* * * * *